United States Patent [19]
Barwise

[11] 3,915,211
[45] Oct. 28, 1975

[54] METHOD OF SHEARING TREE TRUNKS
[76] Inventor: Robert D. Barwise, Rte. 2, Box 208, Bovey, Minn. 55709
[22] Filed: Dec. 6, 1974
[21] Appl. No.: 530,197

Related U.S. Application Data
[60] Continuation of Ser. No. 373,985, June 27, 1973, abandoned, which is a division of Ser. No. 206,675, Dec. 10, 1971.

[52] U.S. Cl. .......................... 144/309 AC; 144/34 E
[51] Int. Cl.² ........................................ A01G 23/08
[58] Field of Search .. 144/34 E, 34 R, 3 D, 309 AC

[56] References Cited
UNITED STATES PATENTS
3,527,272  9/1970  Hamilton ........................... 144/34 E
3,640,322  2/1972  Allen ................................ 144/34 E
3,727,653  4/1973  Tucek ............................... 144/34 E Primary Examiner—Donald R. Schran

[57] ABSTRACT

Relatively thin shearing blades are held in tension by relatively heavy blade frames around the outer periphery thereof, and except along their straight cutting edges. These shearing blades are drawn simultaneously longitudinally along a tree trunk to be sheared in a first direction and transversely into the tree trunk, thereby exerting a drawing, cutting force from the ends of the shearing blades toward which these blades are moving.

3 Claims, 4 Drawing Figures

U.S. Patent    Oct. 28, 1975    Sheet 1 of 2    3,915,211
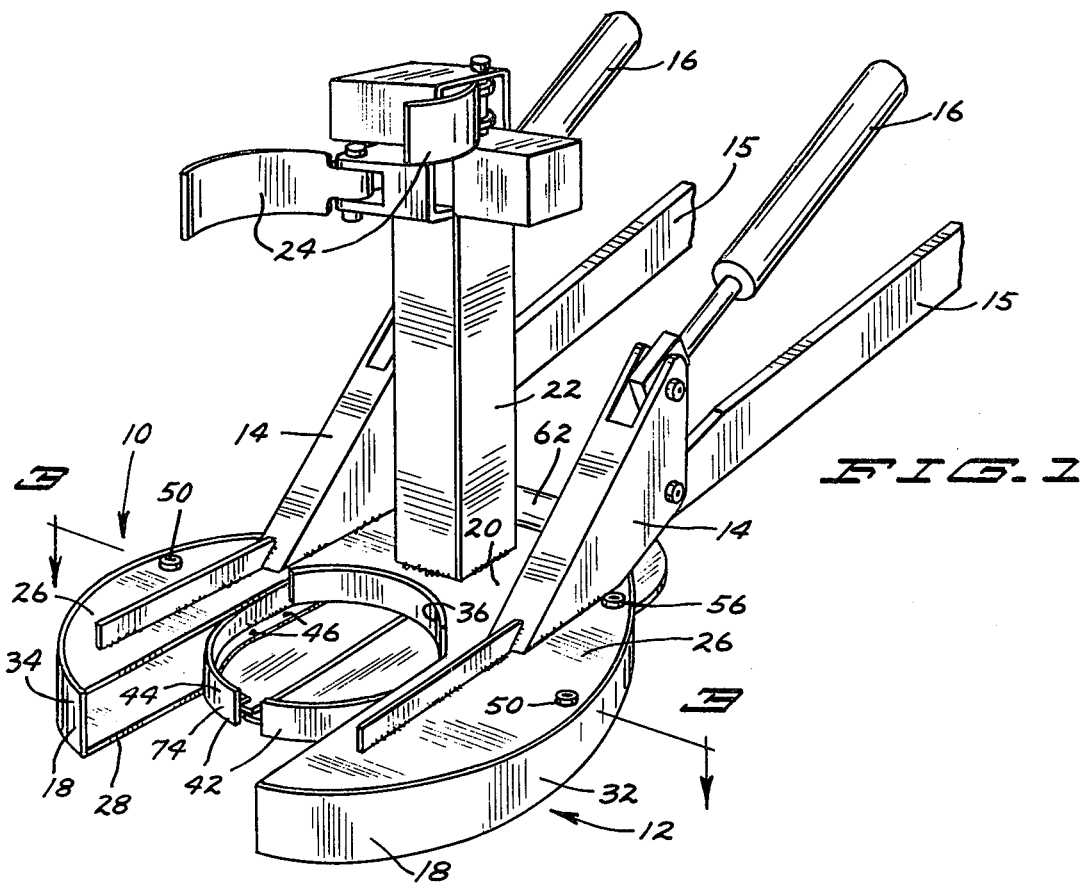
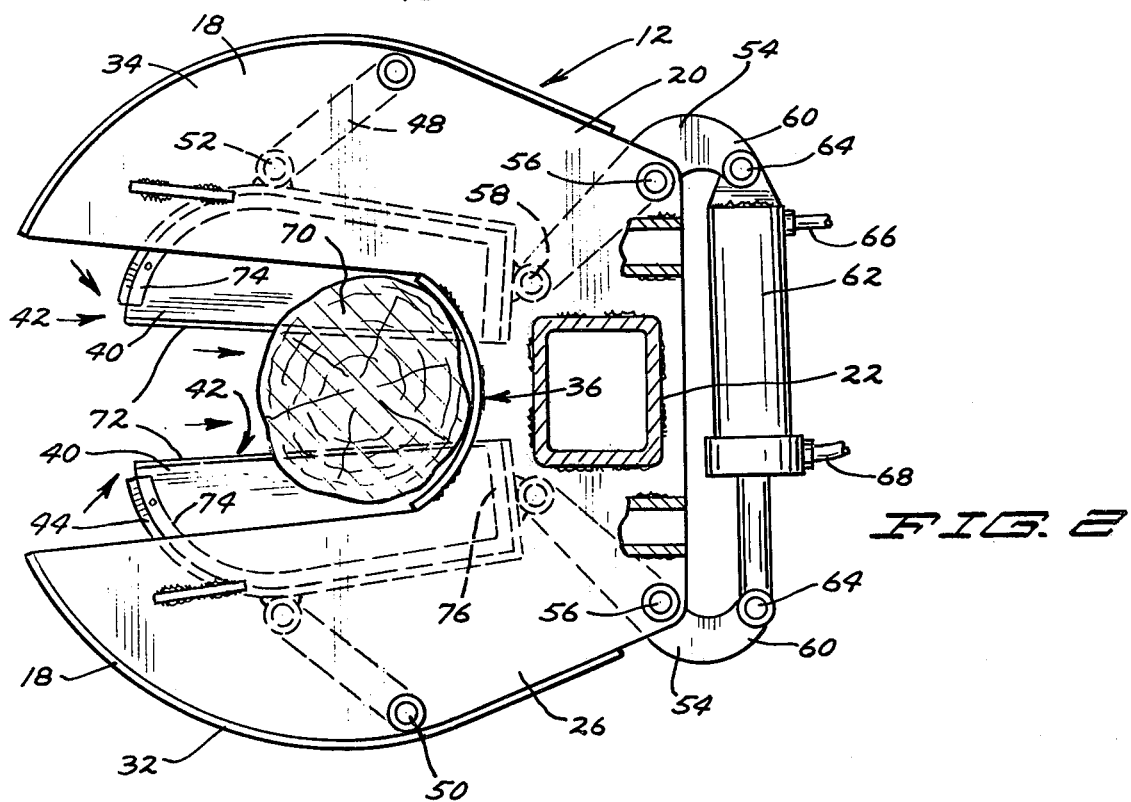

METHOD OF SHEARING TREE TRUNKS

This is a continuation of application Ser. No. 373,985, filed June 27, 1973 now abandoned, which was a division of application Ser. No. 206,675, filed Dec. 10, 1971.

BACKGROUND OF THE INVENTION

This invention relates to a method for cutting tree trunks, logs, and the like by the slicing action of opposed parallel approximately aligned blades moving simultaneously toward each other and toward and through a backup plate against which tree trunks or the like are positioned.

It is well known to use shear blades on fixed pivots to cut tree trunks. See, for example, FIGS. 1 and 6 of U.S. Pat. No. 3,468,352, and FIG. 3 of U.S. Pat. No. 3,122,184. Such structures act by exerting a compressive shearing force on the wood to sever it. This action so crushes the portions of the tree trunks or logs adjacent the cut that the resulting logs not only are not suitable to be sawn into boards, but are so mutilated that the fibers therefrom are not even acceptable to pole and post plants or to pulp mills that grind their wood.

Typically this kind of compressive shearing action consistently results in fiber pulling from the ends of the sheared portions for a total of at least 6 inches, that is, about 3 inches on either side of the sheared butt. A straight shearing action about a fixed pivot, such as disclosed in U.S. Pat. No. 3,468,352 for example, also tends to force the tree trunk out from between the shear blades rather than to hold it in.

Other patents which show compressive shearing and so cause excessive crushing and fiber pulling damage are U.S. Pat. Nos. 3,509,922 and 3,503,429. Because of the use of compressive force in order to accomplish shearing in all of the patents mentioned above, it is essential that an extremely heavy shear blade be used. This blade, necessarily displacing wide areas of the tree trunk as it moves therethrough, necessarily severely increases the amount of fiber that is damaged. Also, use of such thick blades necessarily increases the amount of power needed to force those blades through the tree trunk. This excessive use of power necessitates use of large and heavy increase in frames to carry the shear blades and transmit power thereto.

Slicing action has been attempted with shear blades in the past. See U.S. Pat. Nos. 3,526,272 and 3,270,787. The structures in these patents still rely primarily on a pushing action, however. As shown in each of those patents, substantially the same massive blade size is required to achieve effective shearing action as in the use of blades directly pivoted to a rigid frame. See the cutting member 2 in FIGS. 1 and 3 in U.S. Pat. No. 3,270,787 and cutting member 83 in FIG. 2 of U.S. Pat. No. 3,527,272. Also note the heavy base or frame constructions shown, particularly in FIG. 1 of U.S. Pat. No. 3,270,787. Typically, blades over ½ inch in thickness are utilized to achieve effective shearing actions in these structures of the prior art.

At the time the tree trunk shear of the present invention was being developed, there was a need to reduce fiber damage, and crushing and splitting of the tree trunk at the point of the shearing action. The weight of the shear blades and of the supporting framework needed to be substantially lightened so that the tree shear could be effectively mounted on and handled by small skidders, tractors, front end loaders and knuckle boom, etc. The power requirements had to be reduced sufficiently so that the horsepower available on the majority of existing mobile hydraulic systems could operate the shear.

All of these criteria can be met by circle saws and chain saws, but a sawing action necessarily results in the production of sawdust which is a substantial pollutant at tree trunk processing sites. Where the attributes of the tree trunk shears of the prior art are not acceptable, saws are used today; and a major reason for the development of the tree trunk shear of the present invention is to obtain the disadvantages of the lightness in weight, low power requirements, and flexibility of the sawing operations without the pollutant and other disadvantages attendant on the use of saws. So important is the pollution problem growing out of production of sawdust that, at the time of the writing of this specification, the Canadian government has set a limited time period by the end of which, logging operations must shift from sawing to shearing methods.

Other disadvantages attendant on the use of saws include excessive down time occasioned by the need to sharpen saws. 4½ to 5 hours of actual production time is all that can be expected from one 8 hour shift when saws are used. Saws are many times more hazardous to use than shears under the best of conditions, and are even more unsatisfactory in foul weather and night operations. This necessitates much higher insurance expense.

Against this background the tree trunk shear of the present invention was developed.

SUMMARY OF THE INVENTION

In order to utilize a thinner blade, the tree trunk shearing method of the present invention utilizes a slicing and drawing action in which the blade acts primarily in tension rather than in compression. In order to keep the thinner blade from buckling or collapsing, a heavy, rigid blade support frame is utilized around the outer periphery of each blade except along the cutting edge of that blade. This is similar to holding a sheet of paper between the thumb and forefinger of each hand, maintaining the paper in tension and then drawing it across an object to be cut. Accidental cuts received from paper acting with a true slicing action in tension rather than with a compressive action have been commonly experienced by almost everyone. In order to utilize this slicing action, an open U-shape frame is utilized with the tree trunks or logs or the like to be cut positioned against a backup plate in the base section of the U-shape frame and between the outwardly extending, spaced apart arms of the U.

It is desirable that the shear blades tend to force the wood being cut back into the backup plate of the base section of the U rather than to tend to force the trees outwardly from the base as is the case when two shear blades are pivoted from a single point. This can be accomplished by utilizing shear blades in compression as seen, for example, in FIG. 3 of U.S. Pat. No. 3,122,184; but this necessitates using extremely heavy blades to accomplish the compressive shearing action. This can also be accomplished, as in the present invention, by causing the slicing action to take place in direction to hold and to force the tree trunk or log towards the base of the U-shaped frame.

In the form of the invention as shown, the U-shape frame includes two parallel spaced apart plates with the shear blades each pivotally mounted therebetween to a pair of links, the links and blades moving between the plates from a position where the entire blade is between the plates and the throat of the U is entirely open to receive the trees or the like, to a position where the blades are in contact with each other after having cut through whatever trees were positioned against the base section at the base of the U-shape frame. One set of links is mounted within the base section and this set, in the device as shown, is powered in direction to cause the blades to move toward and away from each other by operating arms extending integrally outwardly from these links and by a double acting extensible and retractible power source, such as a hydraulic cylinder-piston motor.

In the form of the invention as shown, an upright stanchion is attached to the U-shape frame at the base section and suitable grapples are provided on the stanchion for holding the tree trunk to be sheared in an upright position during and after the shearing operation. Suitable beams and hydraulic actuators or the like are provided for the mounting of the device on any suitable vehicle, such, for example, as a tractor. It is to be understood, however, that the principles of the invention would apply equally well were the U-shape frame to be situated at 90° from that illustrated with the arms extending straight up and the base section lying at the bottom. In this form, the invention will be particularly useful in cutting logs to desired lengths, for example.

IN THE DRAWINGS

FIG. 1 is a perspective view of a tree trunk shear made according to one form of the invention;

FIG. 2 is an enlarged top plan view of the device of FIG. 1 with parts broken away and parts in section;

DESCRIPTION OF PREFERRED EMBODIMENT

Figure 3:
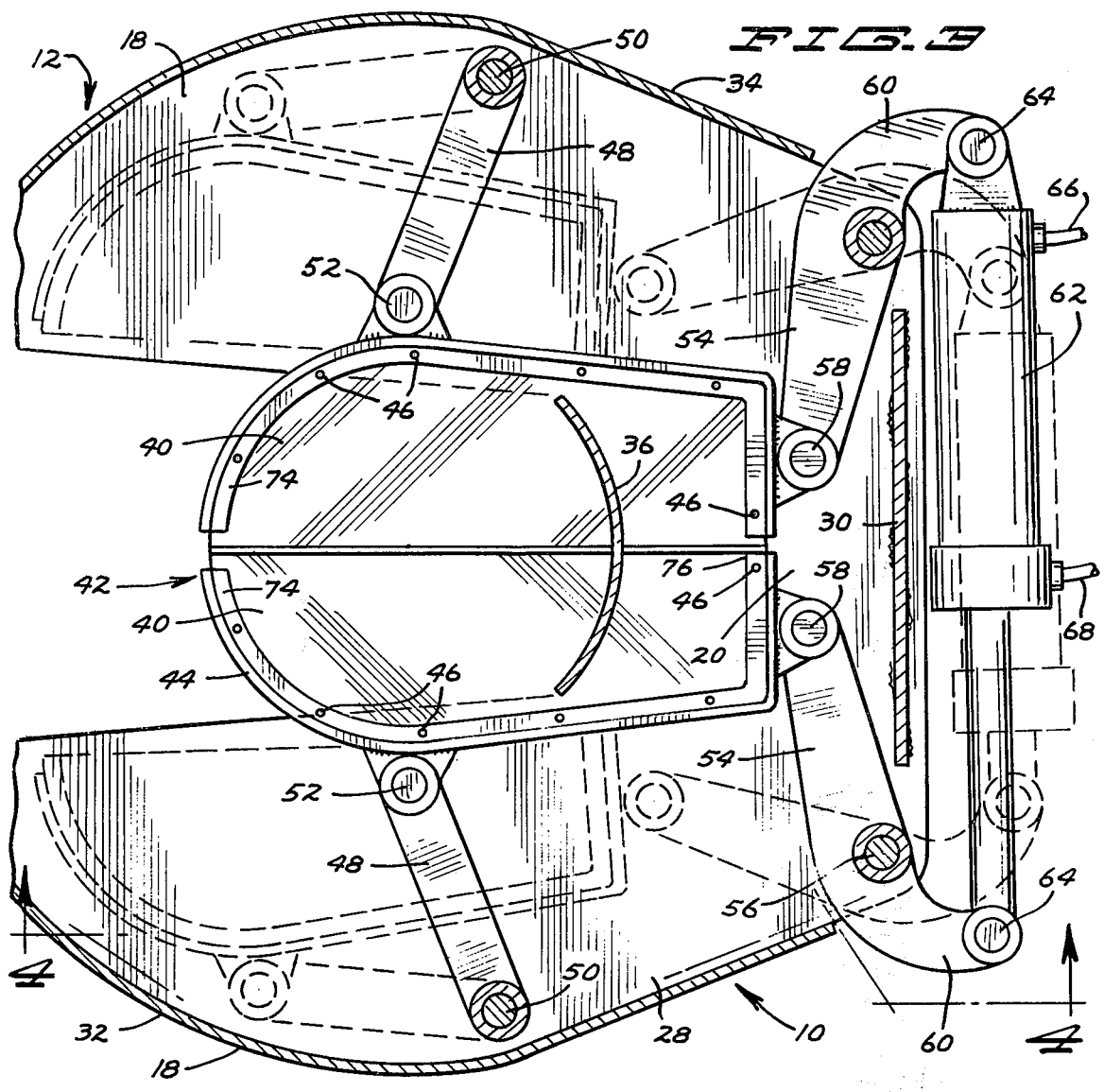
FIG. 3 is a further enlarged horizontal sectional view taken on the line 3—3 in FIG. 1.
Figure 4:
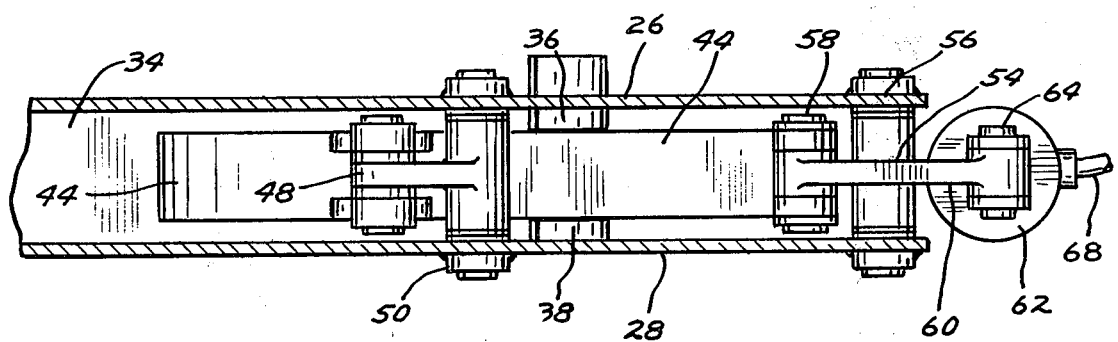
FIG. 4 is vertical sectional view taken generally on the line 4—4 in FIG. 3.

A tree trunk shear 10 includes a U-shape frame 12 to which are welded suitable mounting brackets 14, 14. Mounting beams 15 and hydraulic actuators 16 extend from a suitable vehicle (not shown) such as a tractor having a source of hydraulic fluid under pressure (not shown).

The U-shape frame 12 includes spaced apart open arms 18, 18 integral with and extending outwardly from a base section 20.

An upright stanchion 22 extends integrally from the base section 20, and suitable grapple arms indicated generally at 24 are operably associated with the stanchion to be in position to grasp a tree trunk, or the like, the lower portion of which has been encompassed by the U-shape frame between the arms 18, 18. These grapple arms may be hydraulically or otherwise operated in any usual or preferred manner, forming no part of the present invention.

The U-shape frame 12 is made up of an upper plate 26 and a lower plate 28 fixedly positioned in spaced relationship to each other by integral edge strips 30, 32 and 34. An upper backup plate 36 is integral with and welded to upper plate 26 to form part of the base section 20, and lower backup plate 38 is integral with and welded to lower plate 28 of the U-shape frame 12 also to form part of the base section 20. The upper backup plate and lower backup plate are spaced from each other sufficiently to allow passage of shear blades 40, 40.

These blades 40 are each part of one of the blade assemblies 42, 42. Other parts of each of those assemblies include rigid, relatively stiff, blade frames 44, 44 which are securely fastened as at 46 around the edge portion of each of the blades to stiffen the blades and to tend hold it in tension. While a riveted fastening is shown, it is to be understood that other means for rendering the blade frames integral with the blades, such as welding, could also be used.

Guide toggle links 48, 48 are pivotally mounted as at 50 to the arms 18, 18 of the U-shape frame 12; and are pivotally mounted as at 52 to the outer periphery of the blade frames 44, 44. Draw toggle links 54, 54 are pivotally mounted to the base section 20 of the U-shape frame 12 as at 56 and are pivotally mounted to the innermost edges of the blade frames 44, 44, adjacent cutting edges 72 as at 58. These draw toggle links include operating arms 60, 60, each of which is pivotally mounted as at 64 to an extendible and retractible power means illustrated as a hydraulic cylinder-piston motor 62.

As shown, the hydraulic motor 62 can be caused to extend by introduction of hydraulic fluid under pressure through hydraulic conduit 66 and evacuation of such fluid through hydraulic conduit 68 to and from a source of such fluid (not shown). When the flow in such conduits is reversed, the hydraulic motor will be caused to retract in length.

OPERATION

The operation will be described in terms of felling a tree by shearing its tree trunk 70, but it is to be understood that the relative operation of the parts will be the same regardless of the positioning of the U-shape frame with respect to the horizontal, as long as the relative positioning of this frame with respect to the logs, limbs, tree trunks or other elongated fibrous material remains substantially as explained below.

With the shear blade assemblies 42, 42 positioned as seen in dotted lines in FIG. 3, the mounting beams 15 and hydraulic actuators 16 will be utilized to position the U-shape frame 12 in encompassing relationship to tree trunk 70 as seen in FIG. 2. Grapple arms 24 are engaged with an upper portion of the trunk. Hydraulic fluid under pressure is then introduced through hydraulic conduit 66 to cause power means 62 to be elongated. This forces operating arms 60, 60 of the draw toggle links 54, 54 to move toward each other, thus causing these draw toggle links, acting through blade frames 44, to move the shear blades 40, 40 from the position as seen in dotted lines in FIG. 3, through the position disclosed in FIG. 2, and to the position as shown in FIG. 1 and as shown in full lines in FIG. 3. Sharpened cutting edges 72, 72 of the blades 40 move in substantially parallel relation toward each other with a slicing action as they move simultaneously toward the base section 20 of the U-shape frame. As soon as they encounter the tree trunk 70, they begin a slicing action on the fibers of the trunk, this action tending to draw the trunk more firmly into contact with the upper and lower backup plates 36 and 38.

This action is to be likened to the drawing of a knife edge over the end of the finger. A very substantial pressure can be withstood by the flesh of the finger, for example, when a knife blade is simply pressed against it and without any lateral movement being imparted to it. A slicing movement, however, combined with the inward pressure in exactly the same manner as the blades 40 move with respect to the tree trunk, instantly causes a slicing of the finger. The parallelism of movement of the cutting edges 72, 72 is insured by the guide toggle links 48, 48, pivoted, as they are, to the arms 18, 18 of the U-shape frame 12 and to the rigid blade frames 44 of the shear blade assemblies 42.

The rigidity of the blade frames 44 is such that the tendency of the blades 40 to buckle due to their component of motion toward the heart of the tree 70 will be overcome by forces exerted on the blades in tension acting effectively between an outer end portion 74 of each blade frame and an inner end portion 76 thereof. As set out above, this is comparable to the tensioning of a piece of paper and using its edge portion to slice or cut. Utilizing these rigid outer blade frames, it is obvious that the thickness of the blade is no longer the dominant determining factor in obtaining the rigidity necessary to shear and slide as the blade is drawn (not pushed) through the wood, in accordance with the teaching of the invention.

Stated differently, the cutting edges 72 of the shear blades 40 are something like strings which are held between the forefingers and thumbs of each hand, and are similar to the string-like saws used by surgeons in cutting bone and other material inside of the body, for example, in brain surgery. The difference is that the cutting edges 72, 72 rely on a slicing action to separate the fiber while the string-like saws used by doctors rely on the abrasive quality of the string to cut. In any case, the string-like saw has absolutely no strength in compression. In fact, it hangs like any other string when supported at one point. When supported at two points, however, on the doctor's forefingers, for example, and when moved longitudinally, the material with which the saw is in contact will be sawed apart. The blades 40, moving only in direction toward the frame and in direction toward each other, and, most importantly, being pulled or drawn like the string-like saw, need very little strength in compression, and will not buckle because the forces exerted keep the blades in tension.

As the blades proceed deeper into the heart of the tree trunk being cut, the forces of tension are greatest along the portion of the blade 72 just emerging from the tree trunk. The forces are least at the portion of the blade 72 which has just entered the tree trunk. It is to be understood, therefore, that the necessity for the heavy, rigid blade frame at position beyond point 52 where the guide toggle link is supported on the blade frame is no where near as great as around the rest of the periphery of the blade. In fact, in some instances, it is possible to eliminate this blade frame from the point 52 around towards the outer tip of the blade 40.

As best seen in FIG. 1, the cutting blades 40, 40 as shown, are not in exact horizontal alignment with each other, and actually the cutting edges 72, 72 overlap slightly when the blade assemblies 42, 42 have reached the inward limit of their travel and the tree trunk 70 is completely sheared. It is to be understood, however, that a tree trunk shear of the invention would operate entirely satisfactorily if the blades were in the same plane and the cutting edges did meet.

After the tree trunk has been severed, the hydraulic actuators 16 can be utilized to lift the entire tree trunk shear 10, the grapple arms 24 will maintain the tree trunk in an upright position and in contact with the upper backup plate 36 while the severed tree trunk is being transported with the tree trunk shear toward a desired location for use of the tree trunk. After the grapple arms have been disengaged from the tree trunk, hydraulic motor 62 will be activated to return the shear blade assemblies 42 to position as seen in dotted lines in FIG. 3, and the tree trunk shear 10 can be moved in on another tree trunk to be severed.

While the method of operation of the shear has been described in connection with a single tree trunk, it is to be understood that the method will also be operative where several trees are bunched.

The embodiments of the invention in which an exclusive property or privilege is claimed are defined as follows:

1. The method of shearing elongated fibrous material including the steps of:
    a. supporting opposite end straight edge extremities of a relatively thin sharp straight edge cutting blade in the relatively heavy blade frame to maintain the blade in tension; and
    b. drawing said blade simultaneously longitudinally along said material in a first direction and transversely into said material by exerting the drawing, cutting force from an end thereof toward which the blade is moving in said first direction.

2. The method of claim 1 wherein there are two such relatively thin sharpened straight edge cutting blades supporting in tension; and wherein the drawing step is accomplished simultaneously by each blade moving toward the other and moving longitudinally in said first direction.

3. The method of claim 2 and a first step of supporting the fibrous material against a backup plate; and wherein the step of drawing both blades in said first direction is accomplished by each blade moving toward said backup plate.

* * * * *